United States Patent [19]

Lewis et al.

[11] 4,390,881
[45] Jun. 28, 1983

[54] REAL-DATA DIGITAL-REAL-WEIGHT CANCELER

[75] Inventors: Bernard L. Lewis, Oxon Hill; Frank F. Kretschmer, Laurel, both of Md.

[73] Assignee: The United States of America as respresented by the Secretary of the Navy, Washington, D.C.

[21] Appl. No.: 386,838

[22] Filed: Jun. 9, 1982

[51] Int. Cl.³ .............................................. H04B 7/00
[52] U.S. Cl. ...................... 343/100 LE; 343/100 CL
[58] Field of Search .................. 343/100 LE, 100 CL

[56] References Cited

U.S. PATENT DOCUMENTS

| | | | |
|---|---|---|---|
| 3,978,483 | 8/1976 | Lewis et al. | 343/100 LE |
| 4,086,592 | 4/1978 | Lewis et al. | 343/100 LE |
| 4,222,051 | 9/1980 | Kretschmer et al. | 343/100 LE |

*Primary Examiner*—Theodore M. Blum
*Attorney, Agent, or Firm*—Robert F. Beers; William T. Ellis; Alan P. Klein

[57] ABSTRACT

A canceler for decorrelating one set of signal samples called the main set from another set called the auxiliary set taken from the same domain. It frequency-translates the signals on their intermediate frequency (i.f.) carrier down close to DC using a local oscillator outside one band edge of the signal and samples the resultant signal at a rate equal to twice the information bandwidth or greater and permits using real rather than complex samples. These samples are then converted to digital information in analog-to-digital converters and are processed digitally at a clock rate equal to twice the information bandwidth or greater. The main signal is processed as above but the auxiliary signal is translated down using the same local oscillator signal and, with the same local oscillator signal phase shifted 90° to obtain an inphase and quadrature signal on the same carrier frequency prior to analog-to-digital conversion. Two real weight digital cancelers are used in cascade to cancel components in the main set that are correlated with those in the auxiliary set by canceling first with the inphase and next with the quadrature component of the auxiliary signal.

10 Claims, 3 Drawing Figures

REAL-DATA DIGITAL-REAL-WEIGHT CANCELER

BACKGROUND OF THE INVENTION

The present invention relates to cancelers for use in sidelobe canceler systems, MTI systems and other systems that decorrelate signals by removing correlated components, and more particularly to digital cancelers.

Generally a signal-processing system is designed to reduce the presence of undesired signals received by its receiver. An example of apparatus to reduce undesired signals is a canceller. A canceller may be used for cancelling radar clutter that is correlated from pulse to pulse in an MTI system, for cancelling interference entering a radar's sidelobes in a sidelobe canceller system, and for similiar applications.

Commonly-assigned U.S. Pat. No. 4,086,592 discloses a complex data, digital-complex-weight canceler for a radar system whose receiver includes a local reference oscillator to convert correlated main and auxiliary channel inputs down to baseband frequency range, by mixing the inputs with a reference signal at the carrier frequency of the main input signal, and in addition derive the inphase I and quadrature Q vector components of each input. Generally, the I and Q components of each input are sampled at a rate equal to the main channel signal bandwidth (the highest difference frequency) and converted to the real and imaginary parts of complex digital numbers so that the input to the canceler from the main channel is a dual input comprising a complex digital number, and the input to the canceler from the auxiliary channel is a dual input comprising another complex digital number.

The canceler includes a conjugator, first and second complex multipliers, first and second complex summers, a complex divider, and a third complex multiplier to derive an optimum complex weight for the inputs which is subtracted from the complex main channel input to obtain an uncorrelated main channel output signal.

In microminiature circuits, the number of multipliers, summers, dividers, etc. used is a significant factor in determining the size and economy of the device. The use of a complex weight and complex arithmetic in the canceler disclosed in U.S. Pat. No. 4,086,592 substantially increases its size and cost. For example, a single complex multiplier requires four multipliers, two adders, and one subtractor, in its construction. A design which could significantly reduce the number of multipliers, summers, dividers etc. would enjoy an economic advantage due to that factor alone.

SUMMARY OF THE INVENTION

It is therefore an object of this invention to decorrelate signals by removing correlated components.

It is another object to minimize the hardware required in the construction of a canceler to accomplish such decorrelation.

These and other objects of the present invention are achieved by a real-data digital-real weight canceler which includes input means for receiving a main channel signal having a bandwidth B and a correlated auxiliary channel signal; converter means for mixing both the main channel signal and inphase and quadrature components of the auxiliary channel signal with a reference signal whose frequency is outside the frequency spectrum of the main channel signal; and digitizing means for sampling the difference frequencies of the mixed signals at a rate of at least 2B and converting the samples of the main channel signal to real digital numbers, and the samples of the inphase and quadrature components of the auxiliary channel signal, respectively, to the real and imaginary parts of complex digital numbers. A first adaptive loop means is provided to orthogonalize the real digital numbers and the real part of the complex digital numbers; and a second adaptive loop means is provided to orthogonalize the real digital numbers and the imaginary part of the complex digital numbers.

The two adaptive loop means use real weights and real arithmetic. Thus, for example, a multiplication operation requires only one multiplier. Therefore, the canceler can be constructed from significantly less (down by a factor of 2) hardware than can prior art cancelers, such as in U.S. Pat. No. 4,086,592.

Additional advantages and features will become apparent as the subject invention becomes better understood by reference to the following detailed description when considered in conjunction with the accompanying drawings wherein:

DESCRIPTION OF THE PREFERRED EMBODIMENT

Figure 1:
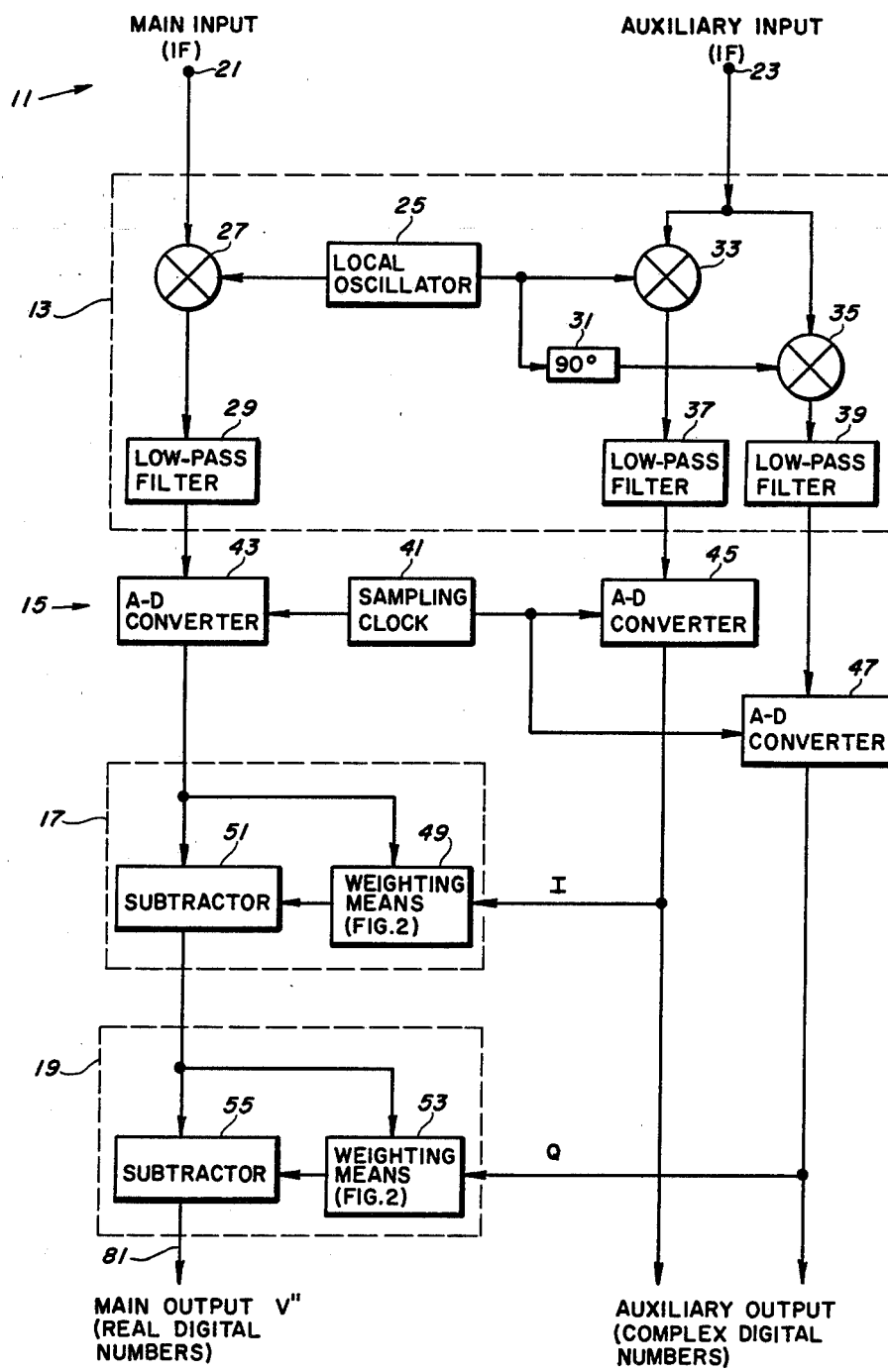
FIG. 1 is a block diagram of an embodiment of the real-data digital-real-weight canceler.

Referring to FIG. 1, the real-data digital real-weight canceler includes input means 11; converter means 13 connected to the input means; digitizing means 15 connected to the converter means; first adaptive loop means 17 connected to the digitizing means; and second adaptive loop means 19 connected to the first adaptive loop means.

The input means 11 (e.g., terminals 21 and 23) is provided to receive a main channel signal having a bandwidth B, and for receiving an auxiliary channel signal which is correlated to the main channel signal. By way of example, the main channel signal could be an IF signal produced by heterodyning a RF radar return received by the main antenna of a radar. The main channel signal contains components of both desired information such as the echos from a target, and undesired components such as interference signals, jamming signals or clutter. The auxiliary channel signal could be the IF signal by heterodyning an RF signal from an omnidirectional auxiliary antenna, or it could be a delayed MTI signal. The auxiliary channel signal has a component which may be correlated to an undesirable component of the main channel signal and which will be used in cancelling this undesirable component.

The converter means 13 is employed to mix both the main channel signal, and inphase and quadrature components of the auxiliary channel signal, with a reference signal whose frequency is outside the frequency spectrum of the main channel signal. While the converter means 13 may take a variety of forms, conveniently it may take the form illustrated in FIG. 1 of a local oscillator 25; a mixer 27 connected to terminal 21 and to the local oscillator; a low-pass filter 29 connected to the mixer; a 90° phase-shifter 31 connected to the local oscillator; a pair of balanced mixers, of which one mixer 33 is connected to the local oscillator and to terminal 23, while the other mixer 35 is connected to the 90° phase-shifter and to terminal 23; and a pair of low-pass filter 37 and 39, each connected to a respective one of the balanced mixers.

The digitizing means is employed to sample the difference frequencies of the mixed signals at a rate of at least 2B and to convert the samples of the main channel signal to real digital numbers and to convert the samples of the inphase and quadrature components of the auxiliary channel signal respectively to the real and imaginary parts of complex digital numbers. While the digitizing means may take a variety of forms, conveniently it may take the form shown in FIG. 1 of a clock 41; an analog-to-digital converter 43 connected to the low-pass filter 29 and to the clock; and a pair of analog-to-digital converters 45 and 47, each connected to a respective one of the low-pass filters 37 and 39 and to the clock.

The first adaptive loop means 17 orthogonalizes the real digital numbers and the real parts of the complex digital numbers. While a variety of first adaptive loop means may be employed, conveniently it may take the form shown in FIG. 1 of weighting means 49 connected to the A-D converters 45 and 43 to establish a real weight which is a measure of the correlation between the real part of the complex digital numbers and the real digital numbers and for forming the product of the real part of one of the complex digital numbers with the weight; and a subtractor 51 connected to the weighting means and to the A-D converter 43.

The second adaptive loop means 19 orthogonalizes the real digital numbers and the imaginary part of the complex digital numbers. While a variety of second adaptive loop means may be employed, conveniently it may take the form shown in FIG. 1 of weighting means 53 connected to the A-D converter 47 and to the output of the subtractor 51 to establish a real weight which is a measure of the correlation between the imaginary part of the complex digital numbers and the real digital numbers and for forming the product of the imaginary part of one of the complex digital numbers with the weight; and a subtractor 55 connected to the weighting means 53 and to the output of the subtractor 51.

Figure 2:
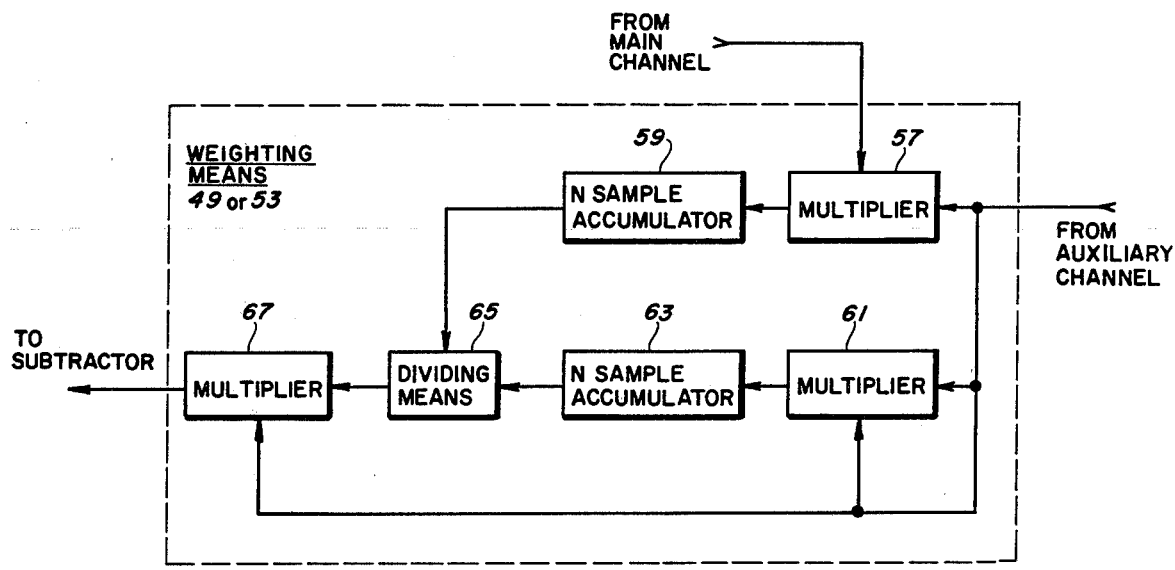
FIG. 2 is a block diagram of an embodiment of the weighting means of FIG. 1.

Referring to FIG. 2, weighting means 49 may comprise, for example, a multiplier 57 connected to A-D converters 45 and 43; an N-sample accumulator 59 connected to the multiplier 57; a multiplier 61 connected to A-D converter 45; an N-sample accumulator 63 connected to the multiplier 61; dividing means 65 connected to the accumulators 59 and 63; and a multiplier 67 connected to the dividing means 65 and to A-D converter 45.

Weighting means 53 is identical to weighting means 49 except that multiplier 57 is connected to A-D converter 47 and to the output of subtractor 51; multiplier 61 is connected to A-D converter 47, and multiplier 67 is connected to the dividing means 65 and to A-D converter 47.

Figure 3:
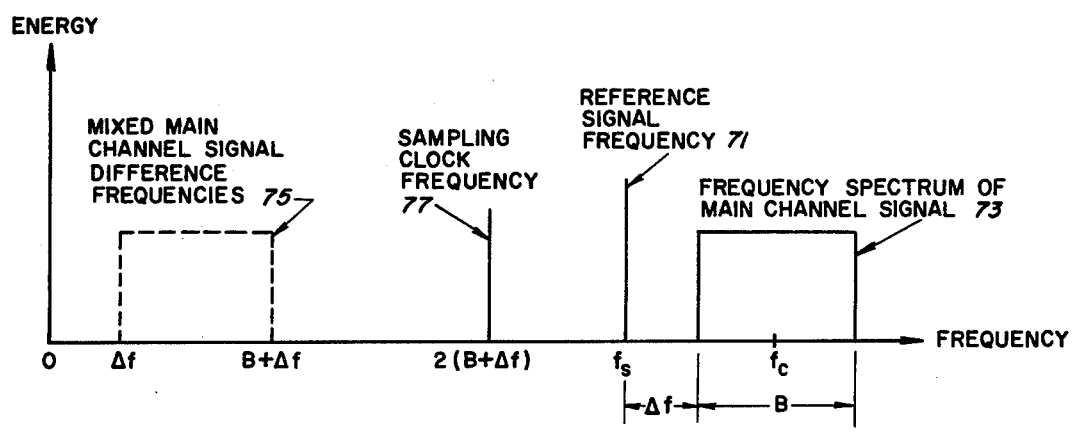
FIG. 3 is a spectral diagram of signals used in the canceler.

Referring to FIGS. 1-3, in operation, the local oscillator 25 generates a reference signal (71 in FIG. 3) whose frequency $f_s$ is different from the carrier frequency $f_c$ of the main channel signal and lies outside the main channel frequency spectrum (73 in FIG. 3). The condition that $f_s$ be unequal to $f_c$ is invoked to eliminate blind phases and the need for a quadrature system in the main channel. More specifically, blind phases (steady phase differences $\Delta\phi$ of 90° between the reference and main channel signals, resulting in a zero average mixer output) cannot occur no matter what the phase of the main channel signal because $\Delta\phi$ continuously changes with time t according to $\Delta\phi = 2\pi (f_c - f_s)t$. The condition that $f_s$ be outside the frequency spectrum of the main channel signal is invoked so that the difference frequency signals will not be undesirably folded about zero frequency.

In the main channel the mixer 27 mixes the main channel signal received at terminal 21 with the reference signal, and the low-pass filter 29 extracts the difference frequencies (75 in FIG. 3). In the auxiliary channel, the mixer 33 mixes the inphase component of the auxiliary channel signal received at terminal 23 with the reference signal, and the mixer 35 mixes the quadrature component of the auxiliary channel signal with the 90° phase-shifted reference signal received from phase-shifter 31. The low-pass filter 37 extracts the inphase difference frequencies, and the low-pass filter 39 extracts the quadrature difference frequencies.

The sampling clock 41 generates sampling clock pulses (77 in FIG. 3) at a rate equal to twice the highest difference frequency in the main channel (the Nyquist frequency). The clock rate may be as little as 2B (e.g., when the reference signal frequency is just outside the lower band edge of the frequency spectrum of the main channel signal, $\Delta f = 0$ in FIG. 3).

In the main channel, the A-D converter 43 samples, at the clock rate, the difference frequencies extracted by low-pass filter 29 and converts the samples of the main channel signal to real digital numbers (V). In the auxiliary channel, the A-D converter 45 samples, at the clock rate, the difference frequencies extracted by low pass filter 37 and converts the sample of the inphase component of the auxiliary channel signal to the real part (I) of complex digital numbers (I+jQ). The A-D converter 47 samples, at the clock rate, the difference frequencies extracted by low pass filter 39 and converts the samples of the quadrature component of the auxiliary channel signal to the imaginary part (Q) of complex digital numbers (I+jQ).

In weighting means 49, the multiplier 57 forms the product V×I of each pair of simultaneously received real digital numbers from A-D converter 43 and the real part I of the complex digital numbers from A-D converter 45, and the accumulator 59 forms the sum of the N products most recently formed by the multiplier 57, where N is an integer greater than one. The multiplier 61 forms the product I×I of the real part I of one of the complex digital numbers received from A-D converter 45 with itself, and the accumulator 63 forms the sum of the N products most recently formed by the multiplier 61. The dividing means divides the outputs of the accumulators 59 and 63 to generate a real weight $\overline{V \times I}/\overline{I+I}$ which is a measure of the correlation between the real part I of the complex digital numbers and the real digital numbers V (the bars denote averaging over N samples). The multiplier 67 forms the product of the weight with the most recently received real part of the complex digital numbers from A-D converter 45 to obtain a weighted number $$\left(\frac{\overline{V \times I}}{\overline{I \times I}}\right) I.$$

This weighted number is then subtracted in the subtractor 51 from the most recently received real digital number from A-D converter 43 to obtain a corrected real digital number $$V' = V - \left(\frac{\overline{V \times I}}{\overline{I \times I}}\right) I$$

which is orthogonal (uncorrelated) to the real part I of the most recently received complex digital number from A-D converter 45. To mathematically verify that V' is indeed orthogonal to I, multiply V' in the above expression by I and average to obtain $$\overline{V' \times I} = \overline{V \times I} - \left(\frac{\overline{V \times I}}{\overline{I \times I}}\right) \overline{I \times I} = 0.$$

In weighting means 53, the multiplier 57 forms the product V'×Q of each pair of simultaneously received real digital numbers from subtractor 51 and the imaginary part Q of the complex digital numbers from A-D converter 47, and the accumulator 59 forms the sum of the N products most recently formed by the multiplier 57. The multiplier 61 forms the product Q×Q of the imaginary part of one of the complex digital numbers received from A-D converter 47 with itself, and the accumulator 63 forms the sum of the N products most recently formed by the multiplier 61. The dividing means divides the outputs of the accumulators 59 and 63 to generate a real weight $\overline{V' \times Q}/\overline{Q \times Q}$ which is a measure of the correlation between the imaginary port Q of the complex digital numbers and the real digital numbers V'. The multiplier 67 forms the product of the weight with the most recently received imaginary part of the complex digital numbers from A-D converter 47 to obtain a weighted number $$\left(\frac{\overline{V' \times Q}}{\overline{Q \times Q}}\right) Q.$$

This weighted number is then subtracted in the subtractor 55 from the most recently received real digital number V' from subtractor 51 to produce the desired canceler output at terminal 81, a real digital number $$V'' = V' - \left(\frac{\overline{V' \times Q}}{\overline{Q \times Q}}\right) Q.$$

V" is orthogonal (uncorrelated) to the imaginary part Q of the most recently received complex digital number from A-D converter 47. To mathematically verify that V" is indeed orthogonal to Q, multiply V" in the above expression by Q and average to obtain $$\overline{V'' \times Q} = \overline{V' \times Q} - \left(\frac{\overline{V' \times Q}}{\overline{Q \times Q}}\right) \overline{Q \times Q} = 0.$$

V" is also orthogonal (uncorrelated) to the real part I of the most recently received complex digital number from A-D converter 45. This follows from the fact that the quadrature component is orginally orthogonal to the inphase component So that Q×I=0. To mathematically verify that V" in indeed orthogonal to I, multiply V" by I and average to obtain $$\overline{V'' \times I} = \overline{V' \times I} - \left(\frac{\overline{V' \times Q}}{\overline{Q \times Q}}\right) \overline{Q \times I} = 0.$$

Since V" is orthogonal (uncorrelated) to both I and Q, it is orthogonal to the complex digital number itself.

As previously stated, V is the digital representation of a main channel signal having a component of desired information such as echos from a target, and undesired components such as interference signals, jamming signals or clutter. I+jQ is the digital representation of an auxiliary channel signal having a component which is correlated to an undesired component of V. The canceller decorrelates I+jQ from the output signal V", meaning that the canceller causes the correlated components of V and I+jQ to cancel and allows the decorrelated components to remain as V". This means the undesired components of V which were correlated cancel while the desired information which was uncorrelated remains, and therefore the canceler passes only uncorrelated main channel signals.

It is obvious that many modifications and variations of the present invention are possible in light of the above teachings. It is therefore to be understood that within the scope of the appended claims, the invention may be practiced otherwise than as described.

We claim:

1. A real-data digital-real-weight canceler comprising:
   input means for receiving a main channel signal having a bandwidth B, and for receiving an auxiliary channel signal which is correlated to the main channel signal;
   converter means connected to the input means for mixing both the main channel signal, the inphase and quaduature components of the auxiliary channel signal, with a reference signal whose frequency is outside the frequency spectrum of the main channel signal;
   digitizing means connected to the converter means for sampling the difference frequencies of the mixed signals at a rate of at least 2B and for converting the samples of the main channel signal to real digital numbers and the samples of the inphase and quadrature components of the auxiliary channel signal respectively to the real and imaginary parts of complex digital numbers;
   first adaptive loop means for orthogonalizing the real digital numbers and the real part of the complex digital numbers; and
   second adaptive loop means for orthogonalizing the real digital numbers and the imaginary part of the complex digital numbers.

2. The canceler recited in claim 1 wherein the first adaptive loop means includes:
   weighting means for establishing a real weight which is a measure of the correlation between the real part of the complex digital numbers and the real digital numbers and for forming the product of the real part of one of the complex digital numbers with the weight.

3. The canceler recited in claim 1 wherein the second adaptive loop means includes:
weighting means for establishing a real weight which is a measure of the correlation between the imaginary part of the complex digital numbers and the real digital numbers and for forming the product of the imaginary part of one of the complex digital numbers with the weight.

4. The canceler recited in claim 2 wherein the first adaptive loop means includes:
a subtractor connected to the weighting means for subtracting the product from the most recently received real digital number.

5. The canceler recited in claim 3 wherein the second adaptive loop means includes:
a subtractor connected to the weighting means for subtracting the product from the most recently received output of the first adaptive loop means.

6. The canceler recited in claim 1 wherein the converter means includes:
a local oscillator for generating the reference signal;
a first mixer connected to the input means and to the local oscillator for mixing the main channel signal with the reference signal;
a first low-pass filter connected to the first mixer for extracting the difference frequencies in the output of the first mixer;
a 90° phase-shifter connected to the local oscillator;
a pair of balanced second mixers, one second mixer connected to the local oscillator and to the input means, the other second mixer connected to the 90° phase-shifter and to the input means for mixing the inphase and quadrature components of the auxiliary channel signal with the reference signal; and
a pair of second low-pass filters, each connected to a respective one of the balanced second mixers for extracting the inphase and quadrature difference frequencies in the output of the pair of balanced mixers.

7. The canceler recited in claim 6 wherein the digitizing means includes:
a clock for generating sampling clock pulses;
an analog-to-digital converter connected to the first low-pass filter and to the clock; and
a pair of analog-to-digital converters, each connected to a respective one of the second low-pass filters and to the clock.

8. A method of real-data digital-real-weight canceling comprising the steps of:
(a) receiving a main channel signal having a bandwidth B and an auxiliary channel signal with which the main channel signal is correlated;
(b) mixing both the main channel signal, and inphase and quadrature components of the auxiliary channel signal, with a reference signal those frequency is outside the frequency spectrum of the main channel signal;
(c) sampling the difference frequencies of the mixed signals at a rate of at least 2B;
(d) converting the samples of the main channel signal to real digital numbers and the samples of the inphase and quadrature components of the auxiliary channel signal respectively to the real and imaginary parts of complex digital numbers;
(e) orthogonalizing the real digital numbers and the real part of the complex digital numbers; and
(f) orthogonalizing the real digital numbers and the imaginary part of the complex digital numbers.

9. The method recited in claim 8 wherein step (e) includes:
establishing a real weight which is a measure of the correlation between the real digital numbers and the real part of the complex digital numbers.

10. The method recited in claim 8 wherein step (f) includes:
establishing a real weight which is a measure of the correlation between the real digital numbers and the imaginary part of the complex digital numbers.

* * * * *